United States Patent [19]

Fink et al.

[11] 4,448,945

[45] May 15, 1984

[54] METHOD OF MAKING EMULSION POLYMERS

[75] Inventors: Herbert Fink, Bickenbach; Werner Siol, Pfungstadt; Horst Dinklage, Dieburg; Hubert Rauch, Weiterstadt, all of Fed. Rep. of Germany

[73] Assignee: Röhm GmbH, Darmstadt, Fed. Rep. of Germany

[21] Appl. No.: 534,939

[22] Filed: Sep. 26, 1983

Related U.S. Application Data

[63] Continuation of Ser. No. 346,004, Feb. 5, 1982, abandoned.

[30] Foreign Application Priority Data

Feb. 21, 1981 [DE] Fed. Rep. of Germany ....... 3106502

[51] Int. Cl.$^3$ ................................................ C08F 4/04
[52] U.S. Cl. .................................... 526/193; 526/213; 526/214; 526/304; 526/307.6; 526/307.7; 526/320; 526/328.5; 526/329.3; 526/329.6; 526/329.7; 526/332; 526/342; 526/346; 526/347
[58] Field of Search ..................... 526/193, 213, 214

[56] References Cited

U.S. PATENT DOCUMENTS 3,963,688  6/1976  Lorenz et al. ...................... 526/193

OTHER PUBLICATIONS

"Emulsion Polymerisation Theory and Practice", Blackley, Applied Science Publishers Ltd., London, pp. 155,156.

Primary Examiner—Joseph L. Schofer
Assistant Examiner—Bernard Lipman
Attorney, Agent, or Firm—Curtis, Morris & Safford

[57] ABSTRACT

What are disclosed are a method for making an emulsion polymer by polymerizing water insoluble free-radically polymerizable monomers, or monomer mixtures predominantly comprising such monomers, by emulsion polymerization in the presence of a polymerization initiator which is soluble in organic solvents and has at least limited solubility in water, and in the further presence of a free non-polymerizable emulsifying acid, also soluble in organic solvents, and the conversion of such an emulsion polymer by spray drying into a polymer powder which is completely soluble in organic solvents to form clear solutions from which polymer films of reduced water sensitivity can be formed.

13 Claims, No Drawings

METHOD OF MAKING EMULSION POLYMERS

This application is a continuation, of application Ser. No. 346,004, filed Feb. 5, 1982 abandoned.

The present invention relates to an emulsion polymerization method for the preparation of an emulsion polymer which is completely soluble in organic solvents to form completely clear solutions from which clear polymer films having little sensitivity to water can be cast, to said emulsion polymers in powder form and in the form of clear water-insensitive films, and to solutions of said emulsion polymers in organic solvents. More in particular, the emulsion polymerization method proceeds in the presence of organic solvent-soluble emulsifiers including a free emulsifying acid.

Films prepared from the usual synthetic resin dispersions are water sensitive, which is attributable to their content of water soluble emulsifiers. If the polymer is separated from the aqueous phase of the dispersion, for example by spray drying, and is dissolved in an organic solvent, the films which can be prepared from such a solution are also water sensitive in view of their emulsifier content. The conventional synthetic resin dispersions contain emulsifiers in the form of alkali salts which remain unchanged in a coating film on drying.

U.S. Pat. No. 3,847,855 teaches a method for the manufacture of aqueous synthetic resin dispersions which give films of reduced water sensitivity on drying. The emulsifiers employed in this method are present in the form of ammonium salts. On drying of the film, optionally with warming, ammonia is cleaved from the ammonium salts and escapes into the atmosphere. The remaining free emulsifier acid is less hydrophilic than the ammonium salt originally introduced and this leads to a reduced water sensitivity of the film. However, effecting a free radical polymerization in the presence of ammonia or amines is problematic, particularly a polymerization of derivatives of acrylic acid, since such generally leads to an addition of the ammonia to the double bonds of the acrylate. The primary, secondary, or tertiary amines formed in this manner are essentially less volatile than ammonia itself so that these bases remain in the polymer for the most part and give rise to a certain water sensitivity and particularly to a definite tendency toward yellowing.

Ammonium salts of emulsifying acids are also used in the emulsion polymerization method of U.S. Pat. No. 2,680,111 to reduce water sensitivity. In this method, dienes are polymerized together with styrene in the presence of an initiator system which consists of an organic hydroperoxide and a polyamine to form a latex from which a synthetic rubber having reduced water sensitivity can be prepared.

According to German Pat. No. 1,119,513 (U.S. Pat. No. 3,208,965), polyvinyl chloride pastes are prepared by the emulsion polymerization of vinyl chloride in the presence of an oil soluble sodium salt of a sulfosuccinic acid ester. The emulsion polymer is obtained in powder form by spray drying.

The emulsion polymers which are obtained from the dispersions described above, for example those which are obtained in powder form by spray drying, do not give completely clear solutions even in good organic solvents. When coatings prepared from such solutions are dried, more or less cloudy films are formed depending on their thickness. The property of these films of turning white on contact with water is viewed as particularly disadvantageous. This property is attributable to the hydrophilicity of the emulsifier salt which is contained in the coating film. This disadvantage also appears if ammonium salts of emulsifying acids were present in the synthetic resin dispersion originally obtained, from which it can be concluded that ammonia is only incompletely cleaved from the ammonium salt of the emulsifying acid when the film is dried.

According to British Pat. No. 811,693, the products formed by the reaction of an acrylic monomer, sulfur dioxide, and an organic peroxide are used as emulsifiers for emulsion polymerization. Since the free emulsifier acids which are formed thereby are oil soluble, but are only slightly or not at all soluble in water, their water soluble alkali salts are predominantly used for emulsion polymerization. Further, potassium persulfate, which is not oil soluble, is always used as an initiator in the preparation of these prior art dispersions.

Also, Swiss Pat. No. 347,355 contemplates the use of certain ether carboxylic acids in the form of free emulsifying acids in an emulsion polymerization method. In fact, however, in every case the alkali metal salts or ammonium salts of the emulsifier acids are employed.

The dispersions prepared according to the teachings of these patents using free emulsifier acids also do not give completely clear solutions. Films prepared therefrom turn white on contact with water.

The present invention has as its object the preparation, according to a technically useful emulsion polymerization method, of emulsion polymers which are completely soluble in organic solvents. The emulsion polymers are to give clear solutions in organic solvents and these solutions are in turn to give clear films which do not turn white on contact with water.

The invention acknowledges the fact that alkali metal salt emulsifiers render water sensitive films prepared from those emulsion polymers made in the presence of these alkali metal salts. To be sure, since ammonium salts of the emulsifying acids lead to a certain reduction of water sensitivity, but one which is insufficient, ammonium salts are also avoided according to the present invention and only free emulsifying acids are used. But even then fully clear solutions and films and a sufficiently low water sensitivity are not achieved if free radical initiators which are salt-like and which are insoluble in organic solvents are employed. In particular, the persulfate initiators which are commonly used in emulsion polymerization leave behind the corresponding sulfate after free radical decomposition and after subsequent transfer reactions. They cannot practically be removed when the emulsion polymer phase is separated from the aqueous phase and remain in the emulsion polymer. On solution of the polymer in an organic solvent, these salts remain undissolved and produce a cloudiness which, on drying of the solution to form a coating film, does not disappear. On contact of the film with water, the salt crystals take up water by diffusion and go into solution. The trapped drops of solution are detectable as a whitening of the film.

Emulsifying agents suitable for the method of the invention are free acids which are soluble in water at at least a concentration which is effective as an emulsifier and which are present in water to a considerable extent in dissociated form. The acids are non-polymerizable under emulsion polymerization conditions, i.e. they lack free radically polymerizable unsaturations, particularly ethylenic unsaturations. Their $pK_a$-value preferably is no greater than 4.5. Higher fatty acids and other organic carboxylic acids having hydrophobic groups do not generally meet these requirements and as a rule are not suitable as emulsifying agents. The preferred emulsifying acids are organic sulfonic acids and organic phosphonic acids as well as the monoesters or diesters of phosphoric acid with hydrophobic organic hydroxy compounds. For example, these hydroxy compounds are phenols, alkyl phenols, fatty alcohols, or oxethylation products of these hydroxy compounds or of other compounds having an active hydrogen atom, such as fatty acids or fatty acid amides, for example.

Examples of suitable emulsifier acids are the perfluoralkane carboxylic acids having from 8 to 20 carbon atoms in the perfluoralkyl portion, e.g. perfluordecanoic acid; free acids of long-chain sarcosides of the formula R—N(CH$_3$)—CH$_2$—COOH, wherein R is a long-chain saturated or unsaturated aliphatic hydrocarbon having from 8 to 18 carbon atoms, e.g. lauroyl sarcosine; alkylsulfamidoacetic acids having 8 to 20 carbon atoms in the alkyl portion, such as decylsulfamidoacetic acid; alkylsulfonic acids having 8 to 20 carbon atoms in the alkyl portion, such as tetradecylsulfonic acid; alkylarylsulfonic acids having 9 to 24 carbon atoms in the alkylaryl portion, such as dodecylbenzene sulfonic acid or cumene sulfonic acid; and free acids of complex phosphate esters, such as mixtures of primary and secondary esters of optionally oxethylated alkanols or alkylphenols, preferably compounds of the formulas

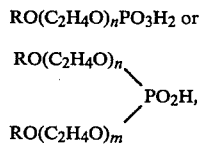

wherein R is alkyl having from 6 to 20 carbon atoms or alkylaryl having from 10 to 24 carbon atoms and n and m are the same or different whole numbers between 0 and 20 inclusive. Typical emulsifying acids of this type are phosphated addition products of, for example, 5 mols of ethylene oxide on 1 mol of isononylphenol.

In addition to the free emulsifying acids, non-ionic emulsifying agents which are conventional in emulsion polymerization can also be employed. Like the free emulsifying acids, they must also be sufficiently soluble in water as well as in organic solvents. As examples, oxethylation products of alkylphenols, fatty acids, and fatty amides are mentioned. The degree of oxethylation can be in the region from 5 to 30.

The amount of the free emulsifying acids and of the non-ionic emulsifying agent which is optionally used depends upon their efficacy and the properties described in the dispersion. The free emulsifying acid is used in general in an amount from 0.01 to 2 percent by preferably in an amount from 0.05 to 1 percent. Non-ionic emulsifying agents can be used in an amount up to about 2 percent. These quantities are in each case referred to the weight of the aqueous phase of the dispersion.

The properties of the emulsion polymer are influenced by the nature of the addition of the free emulsifying acid in the same manner as when using other anionic emulsifiers. If the emulsifying agent is introduced at the beginning of the polymerization in a high concentration, very fine latex particles arise. On the other hand, if the free emulsifying acid is introduced at the beginning of the polymerization near or somewhat below the critical micelle forming concentration and further emulsifying acid and optional non-ionic emulsifying agent are added during or after the polymerization, then larger latex particles arise.

The polymerization is preferably carried out at a pH value which is established by the addition of the free emulsifier acid itself. In no case should the pH value be altered by the addition of bases, since then salt formation occurs with the emulsifying acid and the undesirable consequences of a salt content in the emulsion polymer are in this way brought about. The pH value can, however, be somewhat below the value which is established by the free emulsifying acid itself. This shift can be attributable, for example, to the use of polymerizable carboxylic acids in the monomer mixture which is to be polymerized. However, a too strong lowering of the pH value can suppress the degree of dissociation of the free emulsifying acid, whereby its efficacy as an emulsifier would be impaired.

The salt-like water soluble initiators, insoluble in organic solvents, which are predominantly used in emulsion polymerization, and particularly the persulfates, are unsuitable for use in the process of the invention. The initiators to be used according to the invention must be soluble in organic solvents. In this case, the decomposition products which arise upon free radical decomposition and also possibly in transfer reactions will also be soluble in organic solvents. A solubility of at least about 0.1 percent by weight at 20° C. in a solvent selected from the group consisting of methylethyl ketone, ethyl acetate, butyl acetate, methylisobutyl ketone, gasoline, tetrahydrofuran, cyclohexanone, toluene, xylene, and trichloroethylene is sufficient. On the other hand, the initiators must also be soluble in water at least at the polymerization temperature in a concentration sufficient to initiate polymerization in order to make emulsion polymerization possible. In general, a water solubility of 0.01 percent at 80° C. is sufficient. Examples of initiators which fill these requirements are those peroxides which are soluble in organic solvents, such as dibenzoyl peroxide, dibutyroyl peroxide, cumene hydroperoxide, as well as redox systems formed between peroxides and mercaptans which are soluble in organic solvents, and azo compounds such as azo-bis-isobutyric acid nitrile or 4,4'-azo-bis-4-cyanovalerianic acid. Further, hydrogen peroxide, which leaves behind no decomposition products which are insoluble in organic solvents, is suitable. The initiator is added in an amount from about 0.1 to 1 percent by weight of the aqueous phase, and is added in one or more portions. The polymerization temperature depends upon the decomposition temperature of the initiator and in general is between 50° C. and 100° C.

All water insoluble free radically polymerizable monomers from which emulsion polymers are commonly prepared, or monomer mixtures which predominantly comprise such monomers, are suitable as compounds to be polymerized according to the present invention. If monomer mixtures are used, the content of water insoluble monomers therein shall be such that the polymer formed from the mixture by polymerization is water insoluble. In general, a content of water insoluble monomers greater than 70 percent by weight is preferred. Preferred water insoluble monomers are the esters of acrylic acid and methacrylic acid having 1 to 8 carbon atoms in the alcohol portion. Further, styrene and its homologs, such as vinyltoluene or alpha-methyl-styrene, are important monomers for the method of the invention. Further monomers which should be mentioned are acrylonitrile and methacrylonitrile, vinyl esters such as vinyl acetate or vinyl propionate, dienes and olefins. Hydroxy esters of unsaturated carboxylic acids, acrylamide and methacrylamide together with their methylol compounds and their methylol ethers, and unsaturated carboxylic acids, particularly acrylic acid and methacrylic acid, are monomers which, as a rule, can be contained in minor amounts in the monomer mixture.

As usual, the monomers are emulsified in the aqueous phase which contains the emulsifier and the initiator and are polymerized after warming to the polymerization temperature. Preferably, the monomers are gradually run into the polymerization vessel according to the extent of the polymerization (monomer addition method). The addition of the monomers in the form of an aqueous emulsion in a portion of the aqueous phase is particularly preferred (emulsion addition method). Conventionally, dispersions having a solids content between 20 percent and 60 percent by weight are prepared.

It is to be understood that no monomers may be employed which would impair the clear solubility of the emulsion polymer in organic solvents. Salt-like monomers, such as sodium acrylate or methacrylate, as well as basic monomers, such as the aminoalkyl esters of unsaturated acids, cannot be used since they could form salts with the free emulsifying acid. Also, multiply unsaturated monomers are unsuitable since they lead to crosslinked and insoluble polymers. If monomers such as methylolamides of acrylic acid or methacrylic acid are used, which monomers are capable of crosslinking, attention must be paid that a premature crosslinking does not occur.

The emulsion polymer can be won from the aqueous dispersion using known methods. The winning of the polymer in the form of a powder requires that the glass transition temperature of the polymer is above 20° C., and particularly in the region between 30° C, and 160° C., which can be established in a manner known per se by the choice of the monomers which are polymerized. To favor an easy solubility of the polymer, those recovery methods are preferred in which the latex particles least extensively clump together to form larger aggregates. For example, freeze drying or spray drying methods are suitable, particularly when spray drying temperatures above the glass transition temperature of the emulsion polymer are avoided. The finely divided polymer powder obtained dissolves in a few minutes in organic solvents to produce completely clear solutions. Coating films prepared from the solutions are completely clear and do not become cloudy even when stored in contact with water. The polymer powders can also be combined with other glass-clear synthetic resins, for example hard-polyvinyl chloride, to form mixtures which will form products of unaltered clarity. The powders are thus highly suitable as processing auxiliaries or as additives for the improvement of the impact resistance of polyvinyl chloride and other synthetic resins.

A better understanding of the present invention and of its many advantages will be had by referring to the following specific Examples, given by way of illustration.

EXAMPLE 1

Preparation of the Dispersion

A mixture of 720 g of water, 1 g of an emulsifying acid comprising five-fold oxethylated and phosphated isononylphenol [i-$C_9H_{19}$-$C_6H_4$-$O(C_2H_4O)_5$-$PO_3H_2$], and 0.5 g of azo-bis-isobutyronitrile is introduced into a four-liter round flask equipped with a stirrer and is warmed to 80° C. with vigorous stirring.

An emulsion comprising:
1200 g of methyl methacrylate,
1 g of 2-ethylhexyl thioglycolate,
3.5 g of the aforementioned emulsifying acid ($pK_a < 3.5$),
3.0 g of azo-bis-isobutyronitrile, and
1100 g of water is added dropwise with slow stirring at 80° C. over a period of four hours to the contents of the reaction vessel. After conclusion of the addition, the mixture is held for a further 90 minutes at 80° C., is cooled, and is filtered at room temperature to obtain a low-viscosity easily handled dispersion having a solids content of 39 percent by weight.

The dispersion is subsequently freed of water by spray drying. A white, unglazed powder having a residual moisture content of less than 1 percent is obtained.

Solubility Properties

A fully clear solution having a dry solids content of 10 percent by weight is obtained within three minutes by stirring 20 g of the spray dried powder into 180 g of a mixture of ethyl acetate and methylethyl ketone (1:1).

Film Quality

A film having a layer thickness of 100 microns is applied from the aforementioned 10 percent solution on a substrate and is dried. The film is completely clear and shows no white coloration or cloudiness even after 24 hours of storage under water.

EXAMPLE 2

The following mixture is introduced into a polymerization vessel as in Example 1:
1.4 g of a technical grade alkylphenol-ethylene oxide adduct which is phosphatized, the acid number of which adduct at the first equivalence point is 49–59 and the acid number at the second equivalence point is 85–100, and which phosphatized adduct has a pH value less than 2.5 as a 10 percent aqueous solution, and has a $pK_a < 3.5$,
20.0 g of hydrogen peroxide (30%), and 1400 g of water.

The mixture is heated to 80° C. and, at this temperature, a solution of 1.4 g of the aforementioned emulsifying acid and 600 g of methyl methacrylate are added dropwise over a period of four hours.

Subsequently, the mixture is maintained at 80° C. for three hours, then cooled and filtered. A white unglazed powder having a bulk density of 300 g/l is obtained from the resulting low-viscosity dispersion having a solids content of 28 percent and a pH value of 3 by spray drying. The powder is soluble in ethyl acetate/methylethyl ketone to form a clear solution.

EXAMPLE 3

The procedure of Examples 1 and 2 is followed. Initial batch present in reaction vessel:

12 g of hydrogen peroxide (30 percent solution),
1.5 g of dodecylbenzene sulfonic acid, and
1400 g of water.

To this batch is added, over a period of four hours at 85° C., a solution comprising:

value of 2.6 is obtained, which dispersion can be converted by spray drying into a white unglazed powder.

The solution properties of this powder as well as those of coating films which can be prepared therefrom are summarized in the following Table.

| | | Solution Properties of Spray-Dried Polymethylmethacrylate Powders | | | |
|---|---|---|---|---|---|
| Example No. | Initiator | Emulsifier | Speed of Solubility (in Rapid Mixer) (12% in EE/MEK) | Appearance of the Solution | Appearance of Film After 24 Hour Storage In Water |
| 1 | ABIN | Isononylphenol, oxethylylated, phosphated, acid form | <5 min | clear | clear |
| 2 | $H_2O_2$ | Free acid of a complex organic phosphate-ester | <5 min | clear | clear |
| 4 | $H_2O_2$ | Tetradecyl sulfonic acid, sodium salt | <5 min | transparent, cloudy | cloudy |
| 5 | APS | Tetradecyl sulfonic acid, sodium salt | <5 min | cloudy | cloudy |

ABIN = Azo-bis-isobutyronitrile
APS = Ammonium persulfate
EE/MEK = Ethyl acetate:methylethyl ketone (1:1)

0.4 g of 2-ethylhexyl thioglycolate,
5.0 g of dodecylbenzene sulfonic acid ($pK_a<2$),
4.0 g of azo-bis-isobutyronitrile,
180.0 g of isobutyl methacrylate, and
420.0 g of methyl methacrylate.

After polymerization is concluded, the mixture is maintained for a further two hours at 80° C., then cooled and filtered. A dispersion having a solids content of 28 percent and a pH of 2.1 is formed, from which a white unglazed powder having a bulk density of about 350 g/l is obtained by spray drying. The powder is soluble in ethyl acetate/methylethyl ketone to form a clear solution.

EXAMPLE 4

(Comparison Example)

The procedure of Example 2 is employed.
Present in the reaction vessel:
2.0 g of tetradecyl sulfonic acid, sodium salt,
20.0 g of hydrogen peroxide (30 percent), and
1400.0 g of water.
Addition: 600.0 g of methyl methacrylate.

After addition of the monomer over a period of 4 hours at 80° C. and after 3 hours of post-heating at 80° C., the dispersion is cooled and filtered. A low viscosity dispersion having a solids content of 28 percent is obtained and is dried by spray drying.

The properties of a solution of the polymer in an organic solvent, as well as those of films prepared from the solution, are tabulated below.

EXAMPLE 5

(Comparison Example)

0.1 g of tetradecyl sulfonic acid, sodium-salt
0.3 g of ammonium persulfate, and
400.0 g of completely desalted water
are introduced into a polymerization vessel like that of Example 1. An emulsion, prepared from
2.0 g of tetradecyl sulfonic acid, sodium-salt,
1.3 g of ammonium persulfate,
1000.0 g of methyl methacrylate, and
600.0 g of completely desalted water,
is added dropwise thereto at 80° C. over a period of four hours. Subsequently, the batch is heated for two hours at 80° C. After cooling and filtration, a dispersion having a solids content of 49 percent by weight and a pH

EXAMPLE 6

0.7 g of an emulsifying acid comprising a five-fold oxethylated and phosphated isononylphenol [i-$C_9H_{19}$-$C_6H_4$-O-$(C_2H_4O)_5$-$PO_3H_2$], 10 g of 30 percent hydrogen peroxide, and 1400 g of completely desalted water are introduced into a polymerization vessel as in Example 1.

The batch is warmed to 85° C. and a solution of the following composition is added dropwise at this temperature over a period of four hours:
4.0 g of azo-bis-isobutyronitrile,
2.0 g of the aforementioned emulsifying acid ($pK_a<3.5$),
0.2 g of 2-ethylhexyl thioglycolate,
120.0 g of ethyl acrylate, and
480.0 g of styrene.

The mixture is then heated for a further two hours at 80° C. The material is subsequently cooled, filtered, and an anhydrous polymer is obtained by spray drying. The dry product consists of white unglazed powder grains which dissolve in toluene within ten minutes to form a clear solution.

EXAMPLE 7

1 g of lauroyl sarcosine as an emulsifier ($pK_a<4$),
1 g of azo-bis-isobutyric acid ethyl ester, and
700 g of fully desalted water are introduced into a polymerization vessel like that in Example 1 and warmed to 80° C. with vigorous stirring.

An emulsion is added dropwise into this mixture with slow stirring over a period of four hours at 80°, said emulsion comprising:
200 g of ethyl acrylate,
720 g of methyl methacrylate,
1 g of 2-ethylhexyl thioglycolate,
7 g of lauroyl sarcosine,
5 g of azo-bis-isobutyric acid ethyl ester, and
1380 g of water.

After addition is concluded, the batch is held for a further 90 minutes at 80° C., cooled, and filtered at room temperature. In this way a low viscosity readily handled dispersion having a dry solids content of 30 percent is obtained.

After spray drying a white, unglazed powder results, which dissolves to give a clear solution in a 1:1 mixture of ethyl acetate/methylethyl ketone.

Similar polymer powders also giving clear solutions are obtained if, instead of lauroyl sarcosine as the emulsifier acid, equal amounts of decylsulfamidoacetic acid ($pK_a < 4$), tetradecylsulfonic acid, or perfluordecanoic acid ($pK_a < 3$) are employed.

What is claimed is:

1. A method for making an emulsion polymer which is completely soluble in organic solvents, which method comprises emulsion polymerizing, in an aqueous phase, a monomer component containing more than 70 percent by weight of at least one water insoluble free radically polymerizable mono-unsaturated monomer suitable for preparing an emulsion polymer and selected from the group consisting of esters of acrylic acid and of methacrylic acid having 1 to 8 carbon atoms in the alcohol portion, styrene, vinyltoluene, and alpha-methyl-styrene, in the presence of 0.1 to 1 percent, by weight of the aqueous phase, of a free radical forming azo initiator as the sole initiator, said initiator being soluble to at least about 0.1 percent by weight at 20° C. in a solvent selected from the group consisting of methylethyl ketone, ethyl acetate, tetrahydrofuran, cyclohexanone, toluene, xylene, and trichloroethylene, and in the further presence of 0.01 to 2 percent, by weight of the aqueous phase, of a free emulsifier acid having a $pK_a$- value no greater than 4.5 and selected from the group consisting of organic sulfonic acids, organic phosphonic acids, the monoesters and diesters of phosphoric acid with hydrophobic organic hydroxy compounds or with oxyethylation products of the hydroxy compounds, perfluoralkane carboxylic acids having from 8 to 20 carbon atoms in the perfluoroalkyl portion, free acids of long-chain sarcosides of the formula

R—N(CH$_3$)—CH$_2$—COOH, wherein R is a long-chain saturated or unsaturated aliphatic hydrocarbon having from 8 to 18 carbon atoms, and alkylsulfamidoacetic acids having 8 to 20 carbon atoms in the alkyl portion, said free emulsifier acid being non-polymerizable under the emulsion polymerization conditions employed.

2. A method as in claim 1 wherein said polymer component additionally comprises at least one member selected from the group consisting of the hydroxy esters of unsaturated carboxylic acids, acrylamide, methacrylamide, the methylol and methylol ether compounds of acrylamide and methacrylamide, and unsaturated carboxylic acids.

3. A method as in claim 1 which additionally comprises spray drying the emulsion formed to separate the emulsion polymer from the aqueous phase.

4. A method as in claim 1 wherein said free emulsifier acid is an alkylsulfonic acid having 8 to 20 carbon atoms in the alkyl portion.

5. A method as in claim 1 wherein said free emulsifier acid is an alkylarylsulfonic acid having 9 to 24 carbon atoms in the alkylaryl portion.

6. A method as in claim 1 wherein said free emulsifier acid is at least one member selected from the group of phosphate esters of the formula RO(C$_2$H$_4$O)$_n$PO$_3$H$_2$ and $$\begin{array}{c} RO(C_2H_4O)_n \\ \phantom{RO(C_2H_4O)}\diagdown \\ \phantom{RO(C_2H_4O)mm}PO_2H, \\ \phantom{RO(C_2H_4O)}\diagup \\ RO(C_2H_4O)_m \end{array}$$

wherein R is alkyl having 6 to 20 carbon atoms or is alkylaryl having from 10 to 24 carbon atoms and m and n are the same or different whole numbers between 0 and 20 inclusive.

7. A method as in claim 1 wherein said free emulsifier acid is a sarcoside of the formula

R—N(CH$_3$)—CH$_2$—COOH, wherein R is a saturated or unsaturated aliphatic hydrocarbon having 8 to 18 carbon atoms.

8. An emulsion polymer completely soluble in organic solvents made by the method of claim 1.

9. An emulsion polymer completely soluble in organic solvents made by the method of claim 3.

10. A clear solution of an emulsion polymer as in claim 8 in an organic solvent.

11. A clear solution of an emulsion polymer as in claim 9 in an organic solvent.

12. A clear water resistant polymer film cast from a solution as in claim 10.

13. A clear water resistant polymer film cast from a solution as in claim 11.

* * * * *